(12) United States Patent
Weder

(10) Patent No.: US 6,182,393 B1
(45) Date of Patent: *Feb. 6, 2001

(54) ASSEMBLY FOR DISPLAYING A WRAPPED FLORAL GROUPING MOUNTED ON A SUPPORT SURFACE

(75) Inventor: Donald E. Weder, Highland, IL (US)

(73) Assignee: Southpac Trust Int'l., Inc.

( * ) Notice: Under 35 U.S.C. 154(b), the term of this patent shall be extended for 0 days.

This patent is subject to a terminal disclaimer.

(21) Appl. No.: 09/511,452

(22) Filed: Feb. 23, 2000

Related U.S. Application Data

(60) Continuation of application No. 08/916,816, filed on Aug. 22, 1997, now Pat. No. 6,065,242, which is a division of application No. 08/474,059, filed on Jun. 7, 1995, now Pat. No. 5,697,199.

(51) Int. Cl.[7] ................................ A01G 5/02; A01G 5/04
(52) U.S. Cl. ................................ 47/41.01; 47/72; 53/399; 53/397; 206/423; 40/594; 40/661.09; 248/205.3; 248/683; 248/27.8
(58) Field of Search ................. 47/41.01, 72; 248/205.3, 248/683, 27.8; 40/658, 594, 661.09, 124.2; 206/423; 53/397, 399, 461, 465

(56) References Cited

U.S. PATENT DOCUMENTS

| Re. 21,065 | 5/1939 | Copeman ................................ 93/2 |
|---|---|---|
| 508,149 | * 11/1893 | Schumm ................................ 428/23 |
| 732,889 | 7/1903 | Paver . |
| 1,024,215 | * 4/1912 | Lytle ................................ 248/27.8 |
| 1,064,813 | * 6/1913 | Bloomberg ................................ 206/756 |
| 1,446,563 | 2/1923 | Hughes . |
| 1,525,015 | 2/1925 | Weeks . |
| 1,807,407 | 5/1931 | Hohnhorst . |
| 1,863,216 | 6/1932 | Wordingham . |
| 1,978,631 | 10/1934 | Herrlinger ................................ 91/68 |
| 2,048,123 | 7/1936 | Howard ................................ 229/87 |
| 2,170,147 | 8/1939 | Lane ................................ 206/56 |
| 2,217,454 | * 10/1940 | Pfeiffer ................................ 206/423 |
| 2,278,673 | 4/1942 | Savada et al. ................................ 154/43 |
| 2,302,259 | 11/1942 | Rothfuss ................................ 41/10 |
| 2,355,559 | 8/1944 | Renner ................................ 229/8 |
| 2,371,985 | 3/1945 | Freiberg ................................ 206/46 |
| 2,411,328 | 11/1946 | MacNab ................................ 33/12 |
| 2,510,120 | 6/1950 | Leander ................................ 117/122 |

(List continued on next page.)

FOREIGN PATENT DOCUMENTS

| 345464 | 2/1917 | (DE) . |
|---|---|---|
| 2221936 | 10/1974 | (FR) . |
| 2610604 | 8/1988 | (FR) . |
| 2675774 | 10/1992 | (FR) . |

OTHER PUBLICATIONS

"Speed Cover—The Simple Solution For Those Peak Volume Periods", Highland SUpply Corporation, 1989, 5 pgs.
"Speed Sheets and Speed Rolls", Highland Supply Corporation, 1990, 2 pgs.
"A World of Cut Flower and Pot Plant Packaging", Klerks Plastic Products Manufacturing, date unknown, 6 pages. Applicant admits that the products described in this brochure have been on sale at least more than one year prior to the filing of the present patent application.

Primary Examiner—Michael J. Carone
Assistant Examiner—James S. Bergin
(74) Attorney, Agent, or Firm—Dunlap Codding & Rogers

(57) ABSTRACT

A wrapping material for wrapping an item, such as a floral grouping, is provided. The wrapping material has a bonding material on a surface so that, when the wrapping material is formed into a wrapper, the wrapper may be releasably attached to a mounting surface, such as a board or wall, by way of the bonding material.

20 Claims, 4 Drawing Sheets

U.S. PATENT DOCUMENTS

| | | | |
|---|---|---|---|
| 2,529,060 | 11/1950 | Trillich | 117/68.5 |
| 2,549,352 | 4/1951 | White | 248/27.8 |
| 2,621,142 | 12/1952 | Wetherell | 154/117 |
| 2,707,352 | 5/1955 | Fischer et al. | 47/58 |
| 2,744,624 | 5/1956 | Hoogstoel et al. | 206/65 |
| 2,822,287 | 2/1958 | Avery | 117/14 |
| 2,846,060 | 8/1958 | Yount | 206/58 |
| 2,850,842 | 9/1958 | Eubank, Jr. | 47/58 |
| 2,883,262 | 4/1959 | Borin | 21/56 |
| 2,914,873 * | 12/1959 | Brennan | 40/594 |
| 3,022,605 | 2/1962 | Reynolds | 47/58 |
| 3,121,647 | 2/1964 | Harris et al. | 118/202 |
| 3,130,113 | 4/1964 | Silman | 161/97 |
| 3,167,181 | 1/1965 | Goodman | 206/56 |
| 3,261,126 | 7/1966 | Marks | 47/41.12 |
| 3,271,922 | 9/1966 | Wallerstein et al. | 53/3 |
| 3,508,372 | 4/1970 | Wallerstein et al. | 53/3 |
| 3,524,583 | 8/1970 | Gregory | 229/87 |
| 3,620,366 | 11/1971 | Parkinson | 206/59 |
| 3,681,105 | 8/1972 | Milutin et al. | 117/15 |
| 3,754,642 * | 8/1973 | Stidolph | 206/752 |
| 3,793,799 | 2/1974 | Howe et al. | 53/32 |
| 3,813,813 * | 6/1974 | Powell | 47/68 |
| 3,915,302 | 10/1975 | Farrelly et al. | 206/460 |
| 3,924,354 * | 12/1975 | Gregoire | 47/41.01 |
| 4,054,697 | 10/1977 | Reed et al. | 428/40 |
| 4,118,890 | 10/1978 | Shore | 47/28 |
| 4,189,868 | 2/1980 | Tymchuck et al. | 47/84 |
| 4,216,620 | 8/1980 | Weder et al. | 47/72 |
| 4,280,314 | 7/1981 | Stuck | 53/241 |
| 4,297,811 | 11/1981 | Weder | 47/72 |
| 4,300,312 | 11/1981 | Weder | 47/72 |
| 4,301,205 * | 11/1981 | Seltenheim et al. | 428/127 |
| 4,333,267 | 6/1982 | Witte | 47/84 |
| 4,380,564 | 4/1983 | Cancio et al. | 428/167 |
| 4,400,910 | 8/1983 | Koudstaal et al. | 47/84 |
| 4,403,000 * | 9/1983 | Gates | 427/206 |
| 4,413,725 | 11/1983 | Bruno et al. | 206/45.33 |
| 4,546,875 | 10/1985 | Zweber | 206/0.82 |
| 4,621,733 | 11/1986 | Harris | 206/423 |
| 4,640,079 | 2/1987 | Stuck | 53/390 |
| 4,678,150 | 7/1987 | Newmann et al. | 248/205 |
| 4,765,464 | 8/1988 | Ristvedt | 206/0.82 |
| 4,799,520 | 1/1989 | Blackburn et al. | 150/52 |
| 4,801,014 | 1/1989 | Meadows | 206/423 |
| 4,817,805 | 4/1989 | Rodriguez | 211/71 |
| 4,941,572 | 7/1990 | Harris | 206/423 |
| 4,942,071 * | 7/1990 | Frye | 428/40.6 |
| 4,996,822 | 3/1991 | Truppe | 53/213 |
| 5,092,465 | 3/1992 | Weder et al. | 206/423 |
| 5,111,638 | 5/1992 | Weder | 53/397 |
| 5,148,918 | 9/1992 | Weder et al. | 206/423 |
| 5,181,364 | 1/1993 | Weder | 53/397 |
| 5,195,637 | 3/1993 | Weder | 206/423 |
| 5,228,234 | 7/1993 | de Klerk et al. | 47/41.01 |
| 5,235,782 | 8/1993 | Landau | 47/72 |
| 5,239,775 | 8/1993 | Landau | 47/72 |
| 5,240,109 | 8/1993 | Weder et al. | 206/423 |
| 5,255,784 | 10/1993 | Weder et al. | 206/423 |
| 5,311,992 | 5/1994 | Weder et al. | 206/423 |
| 5,318,821 | 6/1994 | Bradley | 428/100 |
| 5,595,298 * | 1/1997 | Straeter | 206/423 |
| 5,817,382 * | 10/1998 | Cheng | 428/40.1 |

* cited by examiner

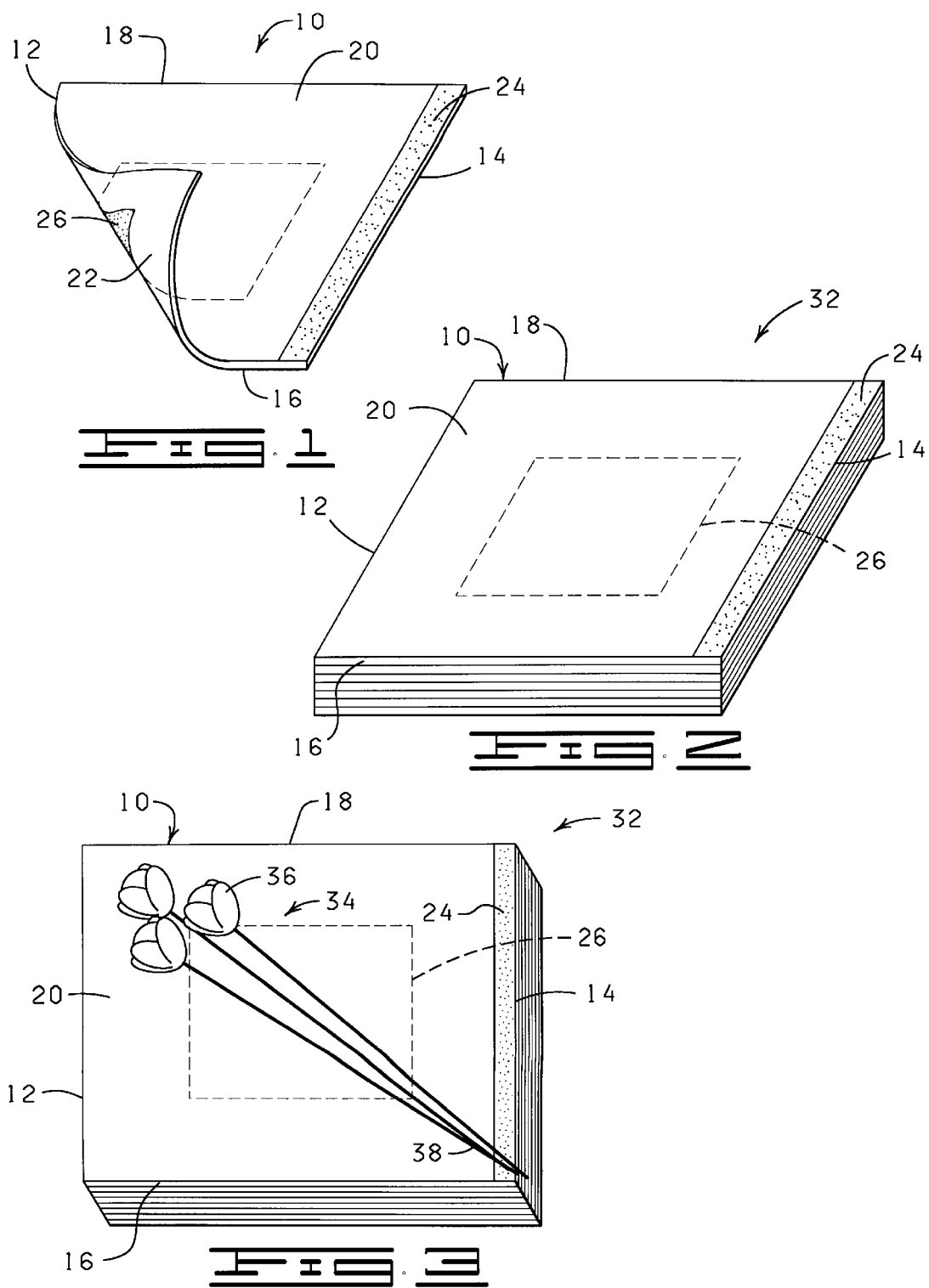

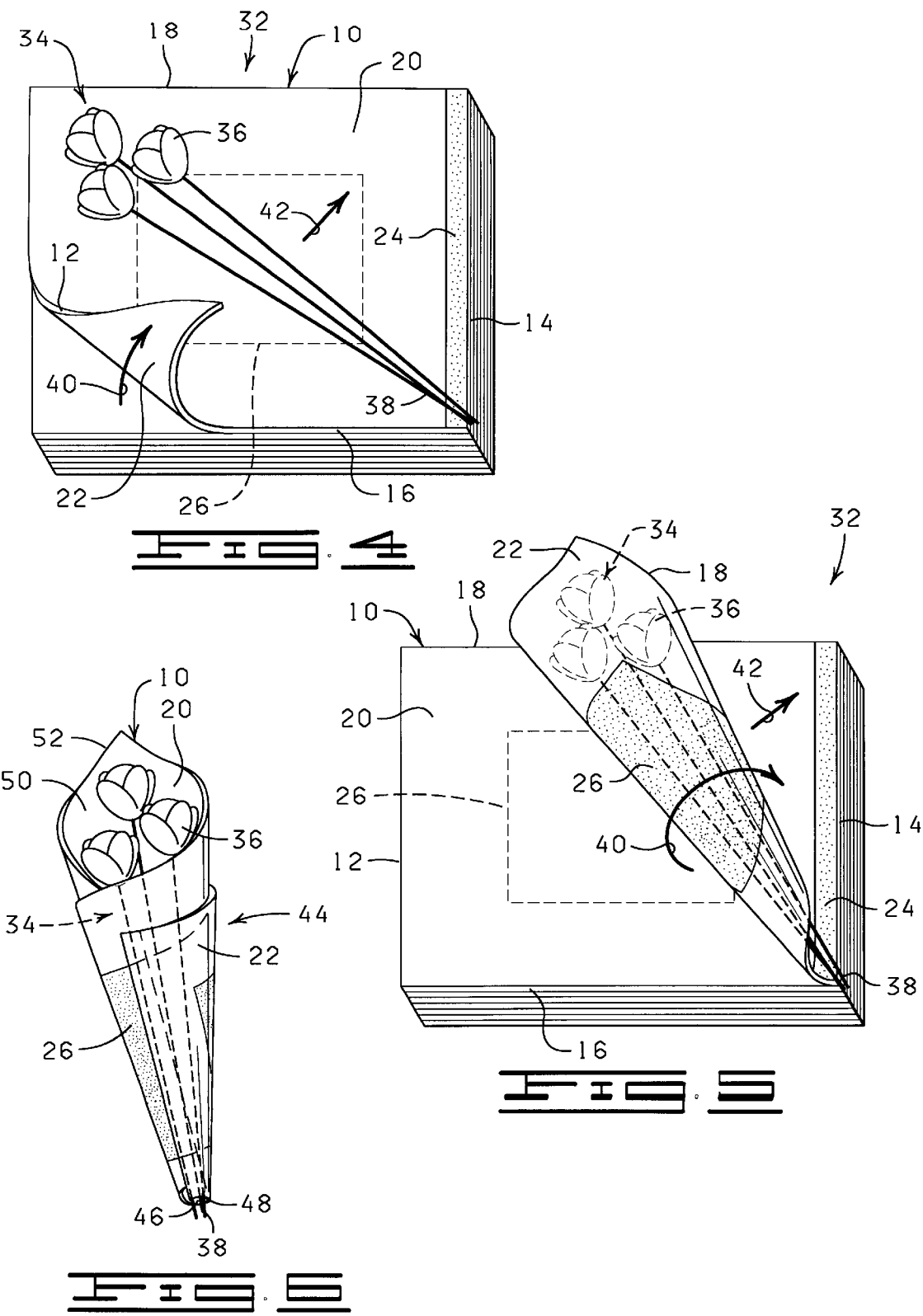

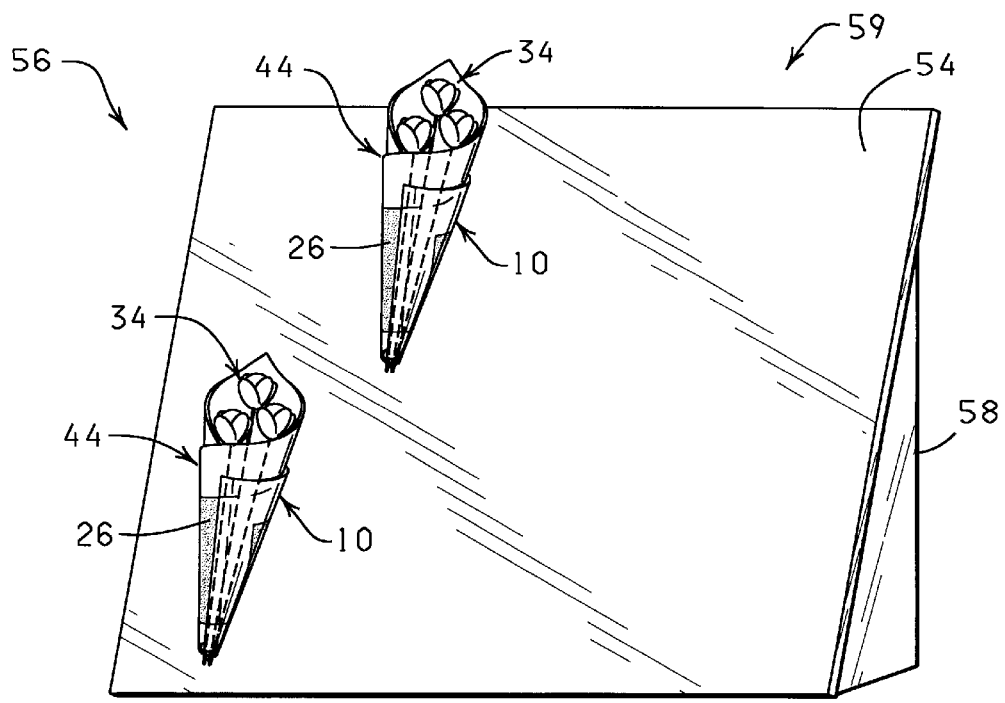
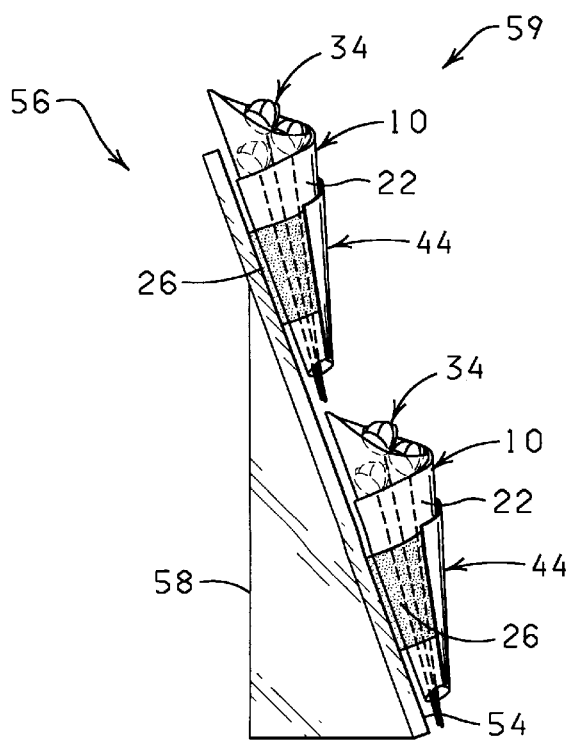

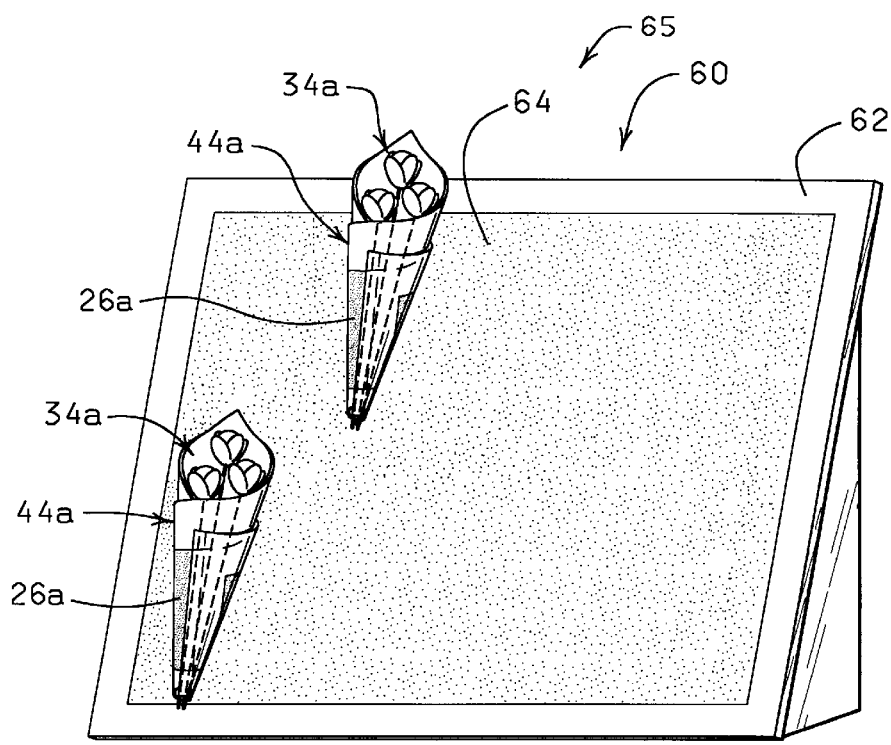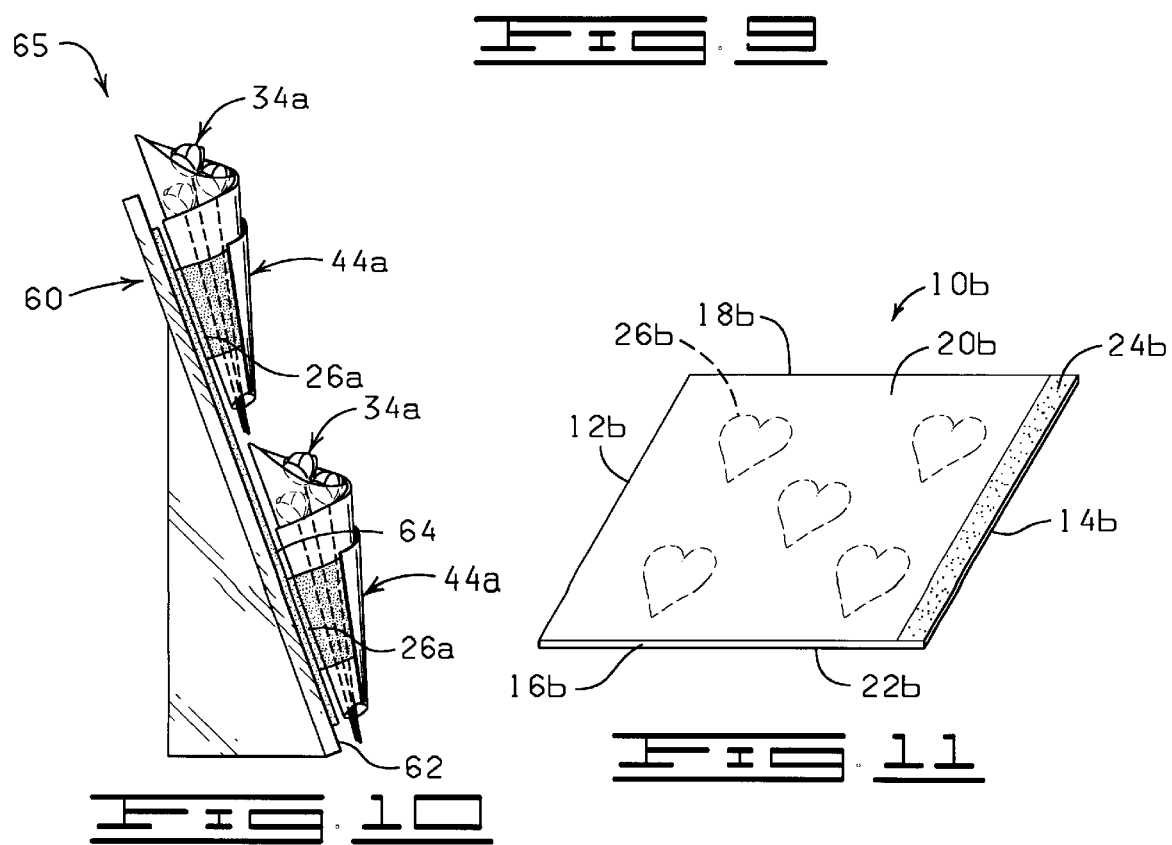

ASSEMBLY FOR DISPLAYING A WRAPPED FLORAL GROUPING MOUNTED ON A SUPPORT SURFACE

RELATED REFERENCES

This application is a continuation of U.S. Ser. No. 08/916,816, filed Aug. 22, 1997, entitled MOUNTABLE AND DEMOUNTABLE WRAPPING MATERIAL AND METHOD FOR USE, now U.S. Pat. No. 6,065,242, issued May 23, 2000; which is a divisional of U.S. Ser. No. 08/474,059, filed Jun. 7, 1995, entitled MOUNTABLE AND DEMOUNTABLE WRAPPING MATERIAL AND METHOD FOR USE, now U.S. Pat. No. 5,697,199, issued Dec. 16, 1997.

FIELD OF THE INVENTION

The present invention relates generally to wrapping material, and more specifically, but not by way of limitation, to a wrapping material that can be mounted and removed from a surface, such as, for example, a wall, display board or window.

BRIEF DESCRIPTION OF THE DRAWINGS

FIG. 1 is a perspective view of a sheet of material constructed in accordance with the present invention.

FIG. 2 is a perspective view of a plurality of sheets of material, each sheet of material constructed in the same manner as the sheet shown in FIG. 1, with the sheets of material connected to form a pad.

FIG. 3 is a perspective view of the pad of sheets of material shown in FIG. 2, with a floral grouping disposed on the top sheet of material in the pad.

FIG. 4 is a perspective view of the floral grouping and pad shown in FIG. 3, with a portion of the top sheet of material positioned to be wrapped about the floral grouping.

FIG. 5 is a perspective view of the pad shown in FIG. 4 with a portion of the top sheet of material wrapped about the floral grouping.

FIG. 6 is a perspective view of the sheet of material shown in FIG. 1 formed into a wrapper containing the floral grouping.

FIG. 7 is a perspective view of two of the wrappers shown in FIG. 6, removably attached to a display assembly.

FIG. 8 is a side view of the wrappers and the display assembly shown in FIG. 7.

FIG. 9 is another embodiment of two wrappers constructed in accordance with the present invention and removably attached to a display assembly.

FIG. 10 is a side view of the wrappers and the display assembly shown in FIG. 9.

FIG. 11 is a perspective view of another sheet of material constructed in accordance with the present invention.

DESCRIPTION OF THE PREFERRED EMBODIMENTS

Shown in FIG. 1 is a sheet of material 10 constructed in accordance with the present invention. The sheet of material 10 has a first side 12, a second side 14, a first end 16, a second end 18, an upper surface 20 and a lower surface 22. A strip of bonding material 24 is applied to the upper surface 20 near to or adjacent the second side 14. The strip of bonding material 24 extends between the first and second ends 16 and 18 of the sheet of material 10. The term "connecting element 24" is used interchangeably herein with the term strip of "bonding material 24".

The term "bonding material" as used herein means an adhesive, preferably a pressure sensitive adhesive, or a cohesive. Where the bonding material is a cohesive, a similar cohesive material must be placed on an adjacent surface for bondingly contacting and bondingly engaging the cohesive material. In the embodiment of the invention shown in FIG. 1, the strip of bonding material 24 extending between the first end 16 and the second end 18 of the sheet of material 10 is an adhesive.

The sheet of material 10 additionally has a patch of bonding material 26 disposed on a portion of the lower surface 22 of the sheet of material 10. In the embodiment shown in FIG. 1 the patch of bonding material 26 is an adhesive. The term "connecting element 26" may be used interchangeably herein with the term "patch of bonding material 26".

The sheet of material 10 is constructed from any suitable material that is capable of being wrapped about an item as described herein. Preferably, the sheet of material 10 comprises paper (untreated or treated in any manner), cellophane, foil, man-made organic polymer film or combinations thereof. The sheet of material 10 can also be cloth (natural or synthetic) or burlap (natural or synthetic), or combinations thereof.

The sheet of material 10 may be constructed of a single layer of material or a plurality of layers of the same or different types of materials. Any thickness of the sheet of material 10 may be utilized in accordance with the present invention as long as the sheet of material 10 is wrappable about an item. Additionally, an insulating material, such as bubble film, preferable as one of two layers, can be utilized in order to provide needed protection for the item wrapped in the sheet of material 10. In preferred embodiments, the sheet of material 10 is constructed from two polypropylene films (a 20-inch times 50-inch sheet of Mobil 270 ABW white opaque film laminated to a 20-inch by 15-inch sheet of Mobil 220 AB clear film), or from one or more sheets of paper having a thickness in a range from about 1.0 mil to about 2.5 mil although the thickness of the sheets of material 10 could be as great as 30 mil.

The term "man-made organic polymer film" means a man-made resin, such as polypropylene, as opposed to naturally occurring resins such as cellophane.

A man-made organic polymer film is relatively strong and not as subject to tearing (substantially non-tearable) as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof, which may be desirable in many applications such as wrapping a floral grouping. Additionally, a relatively thin film of substantially linearly linked processed organic polymer does not substantially deteriorate in sunlight. Processed organic polymer films having carbon atoms both linearly linked and cross-linked, and some cross-linked polymer films, also may be suitable for use in the present invention provided that such films are substantially flexible and can be made in a sheet-like format for wrapping purposes consistent with the present invention. For example, one man-made organic polymer film is a polypropylene film.

A decorative pattern, such as a color and/or an embossed pattern, and/or such other decorative surface ornamentation may be applied to the upper surface 20 and/or the lower surface 22 of the sheet of material 10 or portions thereof including, but not limited to, printed designs, coatings, colors, flocking or metallic finishes. The sheet of material 10 also may be totally or partially clear or tinted transparent material.

The sheet of material 10 may be of any shape, and a square shape is shown in FIG. 1 only by way of example. The sheet of material 10 is shown in FIG. 1 with the strip of bonding material 24 disposed adjacent the second side 14 of the sheet of material 10. In other embodiments, bonding material in multiple strips or in different positions on sheets of material, other than that discussed in detail below, are used.

A plurality of sheets of material 10 are connected together to form a pad 32 of sheets of material 10, as shown in FIGS. 2–5. The pad 32 contains a plurality of sheets of material 10 with a top sheet of material 10 disposed on the top of the pad 32 and the remaining sheets of material 10 of the pad 32 disposed generally under the top sheet of material 10. Each of the sheets of material 10, including the top sheet of material 10, has a first side 12, a second side 14, a first end 16, a second end 18, an upper surface 20 and a lower surface 22 (shown in FIG. 4). As discussed previously, a strip of bonding material 24 comprising an adhesive is applied to the upper surface 20 of each of the sheets of material 10, including the top sheet of material 10, generally near and extending a distance from the second side 14 thereof. With the strip of bonding material 24 extending generally between the first and second ends 16, 18 of each of the sheets of material 10, the strip of bonding material 24 is applied to the upper surface 20 of each of the sheets of material 10 substantially as shown. Additionally, a patch of bonding material 26 consisting of either a cohesive or an adhesive is applied to the lower surface 22 of each of the sheets of material 10 substantially as shown for the sheet of material 10 in FIG. 1. When the patch of bonding material 26 on the lower surface 22 consists of a cohesive, it cooperates with the strip of bonding material 24 on the upper surface 20 of the adjacent lower sheet of material 10 to assist in holding the sheets of material 10 into the pad 32.

Additionally, the sheets of material 10 can be connected together to form the pad 32 by binding the sheets of material 10 along their second sides 14 with a binding material (not shown). Any conventional binding material capable of binding the second sides 14 of the sheets of material 10 can be employed as the binding material. Such binding materials, as well as the technique for binding sheets of material along one side to form a pad, are well known in the art.

Each of the sheets of material 10 in the pad 32 is releasably connected to the other sheets of material 10 by way of the strip of bonding material 24 and/or the patch of bonding material 26 in a releasable manner. The sheet of material 10 can be removed from the pad 32 by lifting the sheet of material 10 from the pad 32 and disconnecting the bond formed by the strips of bonding material 24 and/or patches of bonding material 26.

As shown in FIG. 3, an item, such as a floral grouping 34, is placed on the upper surface 20 of the top sheet of material 10. The term "floral grouping" as used herein means cut fresh flowers, artificial flowers, or other fresh and/or artificial plants or other floral materials and may include other secondary plants and/or ornamentation which add to the aesthetics of the overall floral grouping 34. The floral grouping 34 has a bloom end 36 and a stem end 38.

The floral grouping 34 is disposed on the top sheet of material 10 of the pad 32 so that a portion of the stem end 38 of the floral grouping 34 overlies a portion of the strip of bonding material 24 substantially as shown.

Referring now to FIGS. 4, 5 and 6, the floral grouping 34 is wrapped within the top sheet of material 10, by lifting a corner of the top sheet of material 10 (formed from adjacent portions of the first side 12 and the first end 16) and placing the corner generally about the floral grouping 34. In this position, the top sheet of material 10 and the floral grouping 34 are rolled in a rolling direction 40 and in a direction 42 (FIG. 4) generally toward the strip of bonding material 24 disposed along the second side 14 of the top sheet of material 10, thereby rolling the top sheet of material 10 about the floral grouping 34 to provide a wrapper 44 (FIG. 6) for the floral grouping 34 having an opening 46 extending through a lower end 48 thereof and an opening 50 extending through an upper end 52 thereof. The patch of bonding material 26 on the lower surface 22 of the sheet of material 10 is thereby exposed and is available to be releasably connected to a surface, as will be explained in detail below.

The stem end 38 of the floral grouping 34 extends through the opening 46 in the lower end 48 of the wrapper 44 and the bloom end 36 of the floral grouping 34 is exposed adjacent to the opening 50 in the upper end 52 of the wrapper 44. The upper end 52 of the wrapper 44 is adjusted as desired to compensate for the size of the bloom end 36 of the floral grouping 34. Once the wrapping of the top sheet of material 10 about the floral grouping 34 is completed, the strip of bonding material 24 is utilized to connect the second side 14 of the top sheet of material 10 to an adjacent portion of the top sheet of material 10, thereby ensuring that the resulting wrapper 44 is securely wrapped generally about the floral grouping 34 and there are substantially no flaps formed by unbonded portions of the top sheet of material 10, as shown in FIG. 6.

When the top sheet of material 10 has been secured about the floral grouping 34 in the manner just described, the sheet of material 10 generally under the top sheet of material 10 then provides a new top sheet of material 10 and the process can be repeated for wrapping additional or other floral groupings 34 until substantially all the sheets of material 10 in the pad 32 have been wrapped about the floral groupings 34.

FIGS. 7 and 8 show two wrappers 44 containing floral groupings 34 disposed on a mounting surface 54, also called interchangeably herein the "support surface 54", of a display assembly 56. The display assembly 56 includes the mounting surface 54 and a support member 58. As shown in FIGS. 7 and 8, the floral grouping 34 is disposed in the wrapper 44 which is disposed adjacent at least a portion of the mounting surface 54/support surface 54 of the display assembly 56. The wrapper 44 is positioned on the support surface 54 of the display assembly 56 such that the wrapper 44 and the floral grouping 34 therein rae displayed on the support surface 54 of the display assembly 56, thereby forming a floral display 59. The wrapper 44 is connected to the support surface 54 of the display assembly 56 via the patch of bonding material 26/connecting element 26 applied to the lower surface 22 of the sheet of material 10, the patch of bonding material 26 being releasably connected to the mounting surface 54/support surface 54 of the display assembly 56. Although the wrapper 44 is shown releasably connected to the mounting surface 54 of a display assembly 56 in FIGS. 7 and 8, it is understood that the wrapper 44 can similarly be connected to other surfaces, such as, for example, and not by way of limitation, a pane of glass, such as in a window, the top surface of a table, or a wall as a support surface 54/mounting surface 54. It will further be understood that any floral display 59 shown and/or described herein my include only the support surface 54 and the wrapper 44 which contains the floral grouping 34 disposed therein.

As previously discussed, the patch of bonding material 26 comprises an adhesive, and more particularly a pressure sensitive adhesive, wherein when pressure is applied to the wrapper 44, the pressure releasably affixes the wrapper 44 to the mounting surface 54 of the display assembly 56. When a pulling or lifting force is applied to the wrapper 44, the force is sufficient to release the wrapper 44 from the mounting surface 54 of the display assembly.

Referring now to FIGS. 9 and 10, a display assembly 60 is shown which is similar to the display assembly 56 shown in FIGS. 7 and 8, except that the display assembly 60 has a mounting surface 62, also called interchangeably herein the "support surface 62", upon which a bonding material 64, also called interchangeably herein the "connecting element 64", consisting of a cohesive is disposed. Two wrappers 44a are affixed to the bonding material 64 of the mounting surface 62 of the display assembly 60, each of the wrappers 44a containing a floral grouping 34a. A floral display 65 for displaying a wrapped floral grouping 34a on a support surface 62 of a display assembly 60 is thereby created, the support surface 62 holding and supporting a wrapper 44a having a floral grouping 34a disposed therein. The floral grouping 34a is disposed in the wrapper 44a and the wrapper 44a is then disposed adjacent at least a portion of the support surface 62 of the display assembly 60, the support surface 62 having a connecting element 64 disposed thereon. The wrapper 44a is positioned on the support surface 62 of the display assembly 60 such that the wrapper 44a and the floral grouping 34a therein are displayed on the support surface 62, and the wrapper 44a is connected to the support surface 62 of the display assembly 60 via the connecting element 64 on the support surface 62.

A portion of the connecting element 64 on the support surface 62 of the display assembly 60 bondingly and releasably connects to a portion of the connecting element 26a disposed on the wrapper 44a, thereby connecting the wrapper 44a to the support surface 62 of the display assembly 60 via the connecting elements 26a and 64, and thereby forming the floral display 65.

When the bonding material 64 on the mounting surface 62 of the display assembly 60 is a cohesive, it is understood that the patch of bonding material 26a on the wrapper 44a will also comprise a cohesive adapted to cohere to the cohesive bonding material 64. By using bonding materials 64 and 26a which are cohesives that can cohere one to another, a releasable connection between the bonding materials 64 and 26a can be made; thus a wrapper 44a can be removably secured to the mounting surface 62 of the display assembly 60, while at the same time allowing a wrapper 44a to be easily removed from the mounting surface 62 of the display assembly 60.

An advantage of using bonding materials 64 and 26a which are compatible cohesives is that the bonding materials 64 and 26a will tend to resist the attraction of extraneous materials such as dirt or lint, because substances other than a compatible cohesive will not cohere to the bonding materials 64 and 26a.

Shown in FIG. 11 is a sheet of material 10b constructed in accordance with the present invention. The sheet of material 10b has a first side 12b, a second side 14b, a first end 16b, a second end 18b, an upper surface 20b, and a lower surface 22b. A strip of bonding material 24b extends between the first and second ends 16b, 18b of the sheet of material 10b. Additionally, a bonding material 26b is applied to the lower surface 22b of the sheet of material 10b. Bonding material 26b disposed on the lower surface 22b of the sheet of material 10b is shown in phantom and is illustrated in the form of five hearts, only one heart being designated by the reference numeral 26b; however, the bonding material 26b can be disposed on the lower surface 22b of the sheet of material 10b in any desired shape, figure, or combination of shapes and figures. For example, and not by way of limitation, the bonding material 26b can be applied to the lower surface 22b of the sheet of material 10b in the form of geometric shapes, stars, diamonds, animal figures, figures of flowers, or other fanciful or decorative designs. Generally, except as discussed above, the sheet of material 10b will be constructed and used in the same manner as the sheet of material 10 shown in FIG. 1.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A floral display for displaying a wrapped floral grouping, comprising:
    a display assembly having a support surface;
    a floral grouping;
    a wrapper disposed about the floral grouping; and
    a bonding material provided on at least one of the support surface of the display assembly and the wrapper for releasably connecting the wrapper having the floral grouping disposed therein to the support surface of the display assembly such that when the wrapper is connected to the support surface of the display assembly, the wrapper and the floral grouping contained therein are displayed on the support surface of the display assembly, thereby forming the floral display.

2. The floral display of claim 1 wherein the bonding material is an adhesive.

3. The floral display of claim 1 wherein the support surface of the display assembly is provided with the bonding material disposed thereon and the wrapper is provided with the bonding material disposed thereon, and the bonding materials disposed on the support surface of the display assembly and the wrapper are cohesives.

4. The floral display of claim 1 wherein the wrapper is formed from a sheet of material selected from the group consisting of paper, foil, polymer film, cloth, burlap and combinations thereof.

5. The floral display of claim 1 wherein the wrapper is further defined as being formed from a sheet of material having a thickness in a range of from about 1 mil to about 30 mil.

6. The floral display of claim 1 wherein the wrapper is further defined as being formed from a sheet of material comprising a polymer film.

7. A floral display for displaying a wrapped floral grouping, comprising:
    a display assembly having a support surface;
    a floral grouping;
    a sheet of material having an upper surface and a lower surface, wherein the sheet of material is wrapped about the floral grouping to provide a wrapper disposed about the floral grouping; and
    a bonding material provided on at least one of the support surface of the display assembly and the sheet of material for releasably connecting the wrapper having the floral grouping disposed therein to the support surface of the display assembly such that when the wrapper having the floral grouping disposed therein is connected to the support surface of the display assembly, the wrapper and the floral grouping disposed therein are displayed on the support surface of the display assembly, thereby forming the floral display.

8. The floral display of claim 7 wherein the support surface of the display assembly is provided with the bonding material disposed thereon.

9. The floral display of claim 8 wherein the bonding material disposed on the support surface of the display assembly is an adhesive.

10. The floral display of claim 7 wherein the sheet of material from which the wrapper is constructed is provided with the bonding material disposed thereon for releasably connecting the wrapper formed from the sheet of material and having the floral grouping disposed therein to the support surface of the display assembly.

11. The floral display of claim 10 wherein the bonding material provided on the sheet of material is an adhesive.

12. The floral display of claim 7 wherein the support surface of the display assembly is provided with the bonding material disposed thereon and the sheet of material from which the wrapper is constructed is provided with the bonding material disposed thereon, and the bonding materials disposed on the support surface of the display assembly and the sheet of material are cohesives.

13. The floral display of claim 7 wherein the sheet of material is selected from the group consisting of paper, foil, polymer film, cloth, burlap and combinations thereof.

14. The floral display of claim 7 wherein the sheet of material has a thickness in a range of from about 1 mil to about 30 mil.

15. A floral display for displaying a wrapped floral grouping, comprising:

a display assembly having a support surface, the support surface having
a bonding material disposed thereon;

a floral grouping;

a sheet of material having an upper surface and a lower surface, wherein the sheet of material is wrapped about the floral grouping to provide a wrapper disposed about the floral grouping; and a bonding material provided on the sheet of material for releasably connecting the wrapper having the floral grouping disposed therein to the support surface of the display assembly such that when the wrapper having the floral grouping disposed therein is connected to the support surface of the display assembly, the wrapper and the floral grouping disposed therein are displayed on the support surface of the display assembly, thereby forming the floral display.

16. The floral display of claim 15 wherein the bonding material disposed on the support surface of the display assembly is an adhesive.

17. The floral display of claim 15 wherein the bonding material provided on the sheet of material is an adhesive.

18. The floral display of claim 15 wherein the bonding material provided on the support surface of the display assembly is a cohesive, and the bonding material provided on the sheet of material is a cohesive.

19. The floral display of claim 15 wherein the sheet of material is selected from the group consisting of paper, foil, polymer film, cloth, burlap and combinations thereof.

20. The floral display of claim 15 wherein the sheet of material has a thickness in a range of from about 1 mil to about 30 mil.

* * * * *